United States Patent [19]

Briones

[11] 4,256,363
[45] Mar. 17, 1981

[54] SPECKLE SUPPRESSION OF HOLOGRAPHIC MICROSCOPY

[75] Inventor: Robert A. Briones, Monterey Park, Calif.

[73] Assignee: The United States of America as represented by the Secretary of the Air Force, Washington, D.C.

[21] Appl. No.: 932,986

[22] Filed: Aug. 8, 1978

[51] Int. Cl.³ .............................................. G03H 1/22
[52] U.S. Cl. ..................................... 350/3.86; 350/12; 350/273
[58] Field of Search ..................... 350/3.81, 3.82, 3.83, 350/3.85, 3.86, 6.2, 12, 16, 268, 273, 320

[56] References Cited

U.S. PATENT DOCUMENTS

| 3,490,827 | 1/1970 | Van Ligten et al. | 350/3.85 |
| 3,511,554 | 5/1970 | Osterberg et al. | 350/12 |
| 3,677,617 | 7/1972 | Upatnieks | 350/3.83 |
| 3,754,814 | 8/1973 | Leith | 350/3.81 X |
| 3,799,643 | 3/1974 | Mailer | 350/3.81 |
| 3,867,009 | 2/1975 | Pawluczyk | 350/3.67 |
| 3,877,776 | 4/1975 | Okino et al. | 350/3.67 |
| 4,043,653 | 8/1977 | Croce et al. | 355/2 |
| 4,155,630 | 5/1979 | Ih | 350/3.85 X |

Primary Examiner—John K. Corbin
Assistant Examiner—John D. Lee
Attorney, Agent, or Firm—Donald J. Singer; Arsen Tashjian

[57] ABSTRACT

An apparatus for, and a method of, reconstructing and viewing a speckled holographic image through a microscope, with the result that the speckle of the holographic image is significantly reduced, without loss of resolution of the image. A finely-structured and transparent light diffuser is interposed thru the aerial image formed by a hologram or an image formed or relayed by a lens system such as a microscope objective prior to the eyepiece. This diffuser is moved in its plane with a rotary or vibratory motion to suppress the speckle.

7 Claims, 1 Drawing Figure

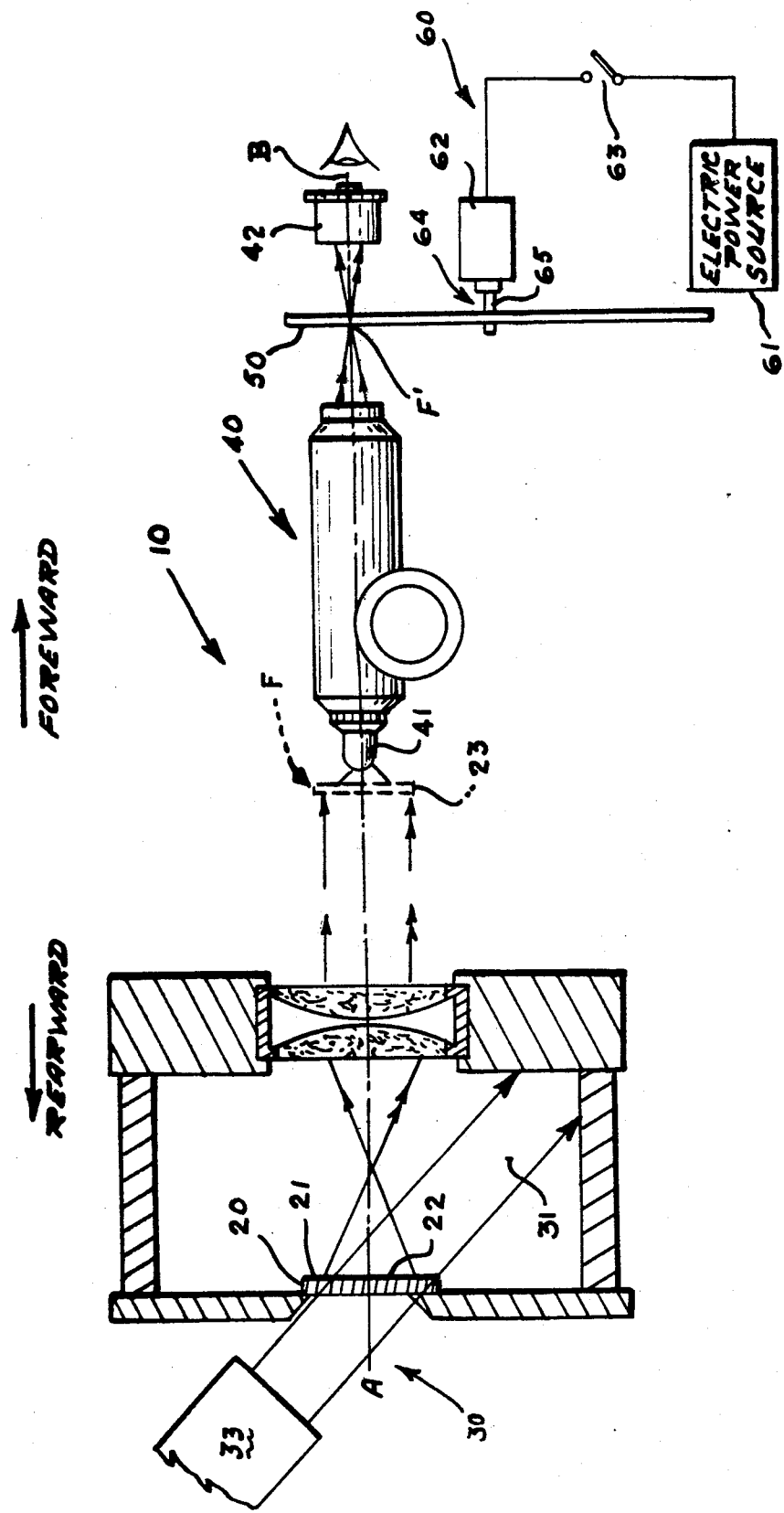

SPECKLE SUPPRESSION OF HOLOGRAPHIC MICROSCOPY

STATEMENT OF GOVERNMENT INTEREST

The invention described herein may be manufactured and used by or for the Government for governmental purposes without the payment of any royalty thereon.

BACKGROUND OF THE INVENTION

This invention relates to an apparatus for, and a method of, reconstructing and viewing a speckled holographic image, whereby the speckle of the holographic image is significantly reduced, without loss of resolution of the image.

Granular field noise, hereinafter referred to (as it is in the art) as "speckle", which masks the microstructure of recorded subjects, is inherent in holography. Continuing attempts have been made to reduce this effect, and many techniques have been tried. A diffuser in the scene beam of two-beam holography reduces the large diffraction noise to a fine-structured speckle. Phase plates, gratings, double holograms, and multi-color, multi-beam techniques have been tried with varying degrees of success.

Similarly, speckle reduction in reconstruction of the hologram has included: beam dithering or motion; extending the source area of the reconstructed beam; and, using a broad spectral line width light source. Speckle reduction by these, and other, techniques has been accompanied by a significant loss of resolution of the reconstructed holographic image.

I have invented an apparatus for, and a method of, reconstructing and viewing a speckled holograhic image, with the result that the speckle is significantly reduced without loss of resolution of the image. Thereby, I have advanced the state-of-the-art.

SUMMARY OF THE INVENTION

The invention permits the reconstruction and viewing of a speckled holographic image, with and by microscope, with significant reduction of the speckle, and without loss of resolution of the image.

Accordingly, the principal object of this invention is to provide an apparatus for, and a method of, accomplishing the above-described significant speckle reduction, without loss of resolution.

This principal object, as well as other related objects, of this invention will become readily apparent after a consideration of the description of my invention, coupled with reference to the drawing.

DESCRIPTION OF THE DRAWING

The drawing is a side elevation view, partially in pictorial form, partially in schematic form, and partially in cross section of my invention.

DESCRIPTION OF THE PREFERRED EMBODIMENT

With reference to the drawing, therein is shown a basic preferred embodiment 10 of my inventive apparatus. Also shown in the drawing, to better orient the reader, are: optical axis A-B; the designations "Forward" and "Rearward", with appropriate directional arrows; and, aerial images at focal positions F and F'.

As can be easily seen, the invention 10 comprises: a developed hologram plate 20 which, when illuminated by a beam 31 of directional (e.g. collimated), monochromatic, coherent light, effects reconstruction of a real holographic image 23 having speckle patterns; a microscope 40 having an objective 41, with the microscope 40 disposed forward of, and in optical alignment with, the reconstructed speckled holographic image 23; a movable, finely-structured, transparent light diffuser 50 disposed at focal position F' between, and in optical alignment with, the microscope objective 41 and the microscope eyepiece 42, as shown in the drawings, or thru the aerial image 23 at focal position F; and, means, generally designated 60, for moving the diffuser 50 in its plane with a rotary, vibratory or other motion.

The means 30 may comprise a continuous wave laser, such as is designated 33, and preferably the laser is either a ruby laser or a helium-neon laser.

The particular diffuser 50 shown is a rotatable disc, and the disc moving means 60 preferably includes: an electric power source 61 (which is also legended in the drawing); an electric motor 62 that is in electrical connection with the electric power source 61; a switch 63 interposed between the motor 62 and the power source 61; and, means, generally designated 64, for selectively imparting rotational motion to the rotatable diffuser 50, with this means 64 interconnected to the motor 62 and the diffuser 50, and with this means 64 preferably including a rotatable shaft, such as is designated 65.

DESCRIPTION OF THE INVENTIVE METHOD

The drawing shows the result of practicing the steps of my inventive method which basically, fundamentally, and essentially comprises five steps.

Firstly, I illuminate the image-recorded front surface 21 of the developed hologram plate 20 with a beam of directional, monochromatic, coherent light, such as 31, with the result that a reconstructed holographic image (having speckle patterns), such as 23, is formed and projected;

Next, I position a microscope, such as 40, which has an objective 41 and an eyepiece 42, forward of, and in optical alignment with, the reconstructed and speckled holographic image 23;

Then, I interpose a rotatable, finely-structured, transparent light diffuser, such as 50, at focal position F' between and in optical alignment with, the microscope objective 41 and the microscope eyepiece 42 or to interpose the aerial image 23 at focal position F;

Next, I move the transparent light diffuser 50, such as by closing switch 63 of means 60 to drive the diffuser in rotation or by moving the diffuser in a vibratory or other motion;

Lastly, I view (as indicated by the eye in the drawing) the reconstructed holographic image through the microscope eyepiece 42.

Thereby, I see the reconstructed holographic image with significant reduction of speckle and without loss of resolution.

MANNER OF USE OF THE PREFERRED EMBODIMENT

The manner of use (and of operation) of my inventive preferred embodiment 10 can be ascertained very easily by a person of ordinary skill in the art from the foregoing description, together with reference to the drawing.

For others, it is sufficient to say in explanation that if one follows the steps of my inventive method as previously set forth herein, and refers to the drawing, one can see how a reconstructed holographic image, that has a significant reduction of speckle and that is clear (i.e., without loss of resolution), can be viewed at eyepiece 42, despite the fact that the hologram plate 20 has a speckled holographic image 22 recorded on it.

CONCLUSION

It is abundantly clear from all of the foregoing, and from the drawing, that the stated and desired principal object, and other related objects, of my invention have been achieved.

It is to be noted that, although there have been described the fundamental and unique features of my inventive apparatus, as applied to a particular preferred embodiment 10, other embodiments, adaptations, omissions, additions, substitutions, variations, and the like, will occur to, and can be made by, those of ordinary skill in the art, without departing from the spirit of my inventive apparatus.

Additionally, because of my teaching, it will occur to others of ordinary skill in the art that, in appropriate particular circumstances, the number and/or the sequence of the basic and fundamental steps of my inventive method can be varied, within the teaching of my method. In that regard, it is to be noted that the same desired results will be attained, nevertheless.

What is claimed is:

1. An apparatus for reconstructing and viewing a holographic image, comprising:
    a. a developed hologram plate having a front surface on which a holographic image has been recorded, wherein said image has speckle patterns therein;
    b. means for illuminating said hologram plate with and by a beam of directional, monochromatic, coherent light, whereby a reconstructed real holographic image having speckle patterns is formed and projected;
    c. a microscope having an objective, and an eyepiece forward of said objective, with said microscope forward of, and in optical alignment with, said reconstructed, speckled, real holographic image, whereby said image impinges upon and is transmitted forwardly by said microscope objective, and thereby a focal point of said transmitted image is formed at a location forward of said microscope objective and rearward of said microscope eyepiece;
    d. a rotatable, finely-structured, transparent light diffuser disposed in optical alignment with said microscope objective and rearward of said microscope eyepiece, wherein said diffuser is concurrently disposed at said focal point formed at said location forward of said microscope objective and rearward of said microscope eyepiece;
    e. and, means for selectively rotating said rotatable diffuser;
    whereby, when said diffuser is rotated, said speckle patterns in said reconstructed real holographic image are significantly reduced, thereby permitting the viewing of a speckle-reduced reconstructed real holographic image through said microscope eyepiece, without loss of resolution of said image.

2. The apparatus, as set forth in claim 1, wherein said means for illuminating said hologram plate includes a continuous wave laser.

3. The apparatus, as set forth in claim 2, wherein said means for illuminating said hologram plate includes a ruby laser.

4. The apparatus, as set forth in claim 2, wherein said means for illuminating said hologram plate includes a helium-neon laser.

5. The apparatus, as set forth in claim 2, wherein said means for selectively rotating said rotatable diffuser includes:
    a. an electric power source;
    b. an electric motor in electrical connection with said power source;
    c. a switch interposed between said motor and said source;
    d. and, means for selectively imparting rotational motion to said rotatable diffuser, with said means interconnected to said motor and to said diffuser, wherein said means includes a rotatable shaft.

6. A method of reconstructing and viewing a holographic image having speckle patterns therein, comprising the steps of:
    a. illuminating a developed hologram plate having a front surface on which a holographic image has been recorded, wherein said image has speckle patterns therein, with a beam of directional, monochromatic, coherent light, whereby a reconstructed real holographic image having speckle patterns is formed and projected;
    b. positioning a microscope, having an objective and an eyepiece, forward of and in optical alignment with the reconstructed, speckled, real holographic image, whereby said image impinges upon and is transmitted forwardly by said microscope objective, and thereby a focal point of said transmitted image is formed at a location forward of said microscope objective and rearward of said microscope eyepiece;
    c. interposing a rotatable, finely-structured, transparent light diffuser in optical alignment with said microscope objective and said microscope eyepiece, wherein said diffuser is concurrently disposed at said focal point formed at said location forward of said microscope objective and rearward of said microscope eyepiece;
    d. rotating said light diffuser;
    e. and, viewing said reconstructed real holographic image through said microscope eyepiece;
    thereby said reconstructed real holographic image is seen with significant reduction of speckle and without loss of resolution.

7. The method, as set forth in claim 6, wherein the step of illuminating the developed hologram plate is performed by using a laser beam.

* * * * *